(12) United States Patent
Gardner et al.

(10) Patent No.: US 9,208,247 B2
(45) Date of Patent: Dec. 8, 2015

(54) REAL ESTATE CONTENT TRACKING ON THE INTERNET

(75) Inventors: Gary Trent Gardner, San Marcos, CA (US); Ata Hassan, Jr., San Diego, CA (US); Ram Babu Chintala, San Diego, CA (US); Anil Srinivas Guntur, San Diego, CA (US)

(73) Assignee: Vendigi, Inc., San Diego, CA (US)

( * ) Notice: Subject to any disclaimer, the term of this patent is extended or adjusted under 35 U.S.C. 154(b) by 444 days.

(21) Appl. No.: 13/530,467

(22) Filed: Jun. 22, 2012

(65) Prior Publication Data

US 2013/0346848 A1 Dec. 26, 2013

(51) Int. Cl.
*G06F 17/30* (2006.01)
*G06Q 50/16* (2012.01)

(52) U.S. Cl.
CPC ............ *G06F 17/3089* (2013.01); *G06Q 50/16* (2013.01)

(58) Field of Classification Search
USPC ..................................... 705/14; 715/234, 206
See application file for complete search history.

(56) References Cited

U.S. PATENT DOCUMENTS

| | | | |
|---|---|---|---|
| 5,584,025 A * | 12/1996 | Keithley et al. ............... | 707/752 |
| 5,845,265 A | 12/1998 | Woolston | |
| 6,253,208 B1 | 6/2001 | Wittgreffe et al. ............ | 707/104 |
| 6,594,633 B1 | 7/2003 | Broerman ........................ | 705/1 |
| 6,636,803 B1 * | 10/2003 | Hartz et al. .................... | 701/459 |
| 6,907,566 B1 | 6/2005 | McElfresh | |
| 7,506,359 B1 * | 3/2009 | Ling ................................ | 726/2 |
| 7,685,229 B1 * | 3/2010 | George et al. ................. | 709/203 |
| 8,140,402 B1 | 3/2012 | Mesaros | |
| 8,521,589 B1 | 8/2013 | Gardner et al. ............ | 705/14.45 |
| 8,849,693 B1 | 9/2014 | Koyfman et al. ............ | 705/14.1 |
| 2003/0055713 A1 | 3/2003 | Pinto | |
| 2004/0138943 A1 * | 7/2004 | Silvernail ........................ | 705/10 |
| 2006/0020510 A1 | 1/2006 | Vest | |
| 2006/0020518 A1 * | 1/2006 | Lovison et al. ................. | 705/26 |
| 2006/0036486 A1 | 2/2006 | Ehr | |
| 2007/0100644 A1 * | 5/2007 | Keillor et al. ..................... | 705/1 |
| 2007/0299829 A1 | 12/2007 | Boinus | |
| 2008/0097842 A1 | 4/2008 | Tirumala | |
| 2008/0114875 A1 * | 5/2008 | Anastas ................. | G06Q 30/02 709/224 |
| 2008/0119167 A1 * | 5/2008 | Rao .............................. | 455/411 |
| 2008/0275753 A1 | 11/2008 | Protheroe | |
| 2009/0019061 A1 * | 1/2009 | Scannell, Jr. .................... | 707/10 |
| 2009/0024404 A1 * | 1/2009 | Morley et al. ..................... | 705/1 |
| 2009/0222554 A1 * | 9/2009 | Schneider ............. | G06Q 30/02 709/224 |
| 2010/0050098 A1 | 2/2010 | Turner | |

(Continued)

OTHER PUBLICATIONS

U.S. Office Action issued in U.S. Appl. No. 13/626,419, dated Feb. 4, 2015; 15 pages.

(Continued)

*Primary Examiner* — Andrew Dyer
(74) *Attorney, Agent, or Firm* — Sheppard Mullin Richter & Hampton LLP

(57) ABSTRACT

Server systems and methods to track digital content pertaining to real estate listings use markers embedded within digital media files. The digital media files are accessible for presentation to client computing platforms through real estate search servers. Responsive to a digital media file being presented, for example through a browser software application, on a client computing platform, information related to browsing activity on the client computing platform is transmitted to a server that associates individual ones of the digital media files with individual ones of the real estate search servers through which a digital media file is presented.

27 Claims, 3 Drawing Sheets

(56) References Cited

U.S. PATENT DOCUMENTS

| | | |
|---|---|---|
| 2010/0058160 A1 | 3/2010 | Navarro |
| 2011/0106616 A1* | 5/2011 | Bigby et al. ............... 705/14.49 |
| 2011/0161173 A1 | 6/2011 | Robbins |
| 2011/0251967 A1* | 10/2011 | Klivington et al. ........... 705/313 |
| 2012/0089597 A1* | 4/2012 | Visioli et al. ................. 707/722 |
| 2012/0101883 A1 | 4/2012 | Akhter |
| 2013/0198040 A1* | 8/2013 | Minard ....................... 705/26.61 |
| 2013/0325623 A1* | 12/2013 | Balduf et al. .............. 705/14.66 |
| 2014/0114749 A1 | 4/2014 | Gardner et al. ............ 705/14.45 |

OTHER PUBLICATIONS

U.S. Office Action issued in corresponding U.S. Appl. No. 13/626,419, dated Oct. 15, 2015, 21 pages.

* cited by examiner

REAL ESTATE CONTENT TRACKING ON THE INTERNET

FIELD

The disclosure relates to systems and methods for tracking digital content pertaining to real estate listings on the internet, and, in particular, the use of markers embedded within digital media files or content particles of digital media files to accomplish this tracking.

BACKGROUND

Accessing real estate search servers via the internet to find information, in particular images, regarding real estate listings is known. Presenting information to client computing platforms is known. Organizing such information in digital media files, such as web pages, is known. Listing agents providing digital media files, and/or the information contained therein, is known. Using a browser software application to present a web page on a client computing platform is known. Hosting sets of digital media files, for example organized in a database, through a media host server is known. A real estate search server accessing a media host server to present a digital media file to a client computing platform is known. Real estate search servers storing copies of digital media files and/or using links to digital media files is known.

SUMMARY

One aspect of the disclosure relates to systems configured to track digital content pertaining to real estate listings on the internet. The system may facilitate communication between listing agents, media host servers, real estate search servers, ad servers, client computing platforms, and/or other entities that are related to real estate and/or real estate listings. The system and/or any entities that communicate with the system may be deployed using a public network and/or using commercial web services.

Digital content pertaining to real estate listings may be provided by listing agents, brokers, and/or other parties. Digital content may include digital media files containing image data, listing information, property information, and/or other information. Digital media files may include markup language files, such as HTML, XHTML, XML, and/or other markup language files, and/or multimedia platform content, such as ADOBE™ FLASH™, and/or multimedia platform content. The image data may for example include jpg-images, png-images, gif-images, mp4 video, and/or other formats for still images, animated images, other graphics/animations, and/or video images. By virtue of using the tracking mechanism disclosed herein, the providers of digital content pertaining to real estate listings may share (advertising and/or sales) revenue as appropriate, e.g. through a pay-per-listing model, and/or be otherwise compensated.

The digital media files may be implemented as and/or included in one or more web pages. A web page is a document or information resource, e.g. in the form of an electronic file, that may be rendered, interpreted, and/or displayed for presentation on a computing platform, such as a client computing platform, particularly through a display, screen, or monitor of the computing platform. Web pages may be accessible from a local computing platform (e.g. not connected to the internet) and/or hosted by a remote web server (e.g. connected to the internet and/or one or more other networks). Web pages may be accessed through a browser software application being executed on a computing platform. Web pages may be static, e.g. stored using electronic storage that is accessible by a web server, dynamic, e.g. constructed when requested, and/or a combination of both. The browser software application may be configured to render, interpret, and/or display one or more web pages for presentation on a computing platform. A set of linked and/or organized web pages may form a website.

A website may include a set of related and/or linked web pages hosted on one or more web servers and accessible via a network, e.g. the internet. Websites and/or web pages may be accessible through an address called a uniform resource locator (URL). Servers may include search servers, media host servers, ad servers, and/or other servers.

A search server may host a website that that allows users, through user interfaces displayed and/or presented on client computing platforms, to interact and/or engage with (searchable) information. For example, a real estate search server may allow a user, through a user interface displayed and/or presented on a client computing platform, to interact and/or engage with a set or database of real estate listings. Users may use a real estate search server to search, e.g. by entering a web search query, for real estate listings that match certain criteria, for example location, size, price range, a particular listing agent, and/or other listing information and/or property information. In response to a web search query from a particular user through a particular client computing platform, a real estate search server may provide access to and/or present one or more digital media files, e.g. through one or more web pages. The one or more web pages may be presented (or displayed for presentation) to the particular user by a browser software application that is being run or executed on the particular client computing platform.

A media host server may host a website that provides storage for, management of, organization of, and/or access to electronic files, e.g. digital media files such as web pages, and/or content particles of such digital media files. The media host server may include an online real estate listing service that provides access to digital media files pertaining to real estate listings. Alternatively, and/or simultaneously, the media host server may be associated with a brokerage firm and/or other people and entities that may be related to or interested in real estate and/or real estate listings, as well as intermediaries and/or associates of such people and entities that provide access to digital media files pertaining to real estate listings. Online entities may be able to provide electronic files to a media host server such that the media host server may provide access to those electronic files at a future time. For example, one or more listing agents may provide digital media files pertaining to real estate listings to a media host server, which in turn may be accessed by one or more real estate search servers, e.g. in response to searches and/or queries from users as described above in relation to real estate search servers. Real estate search servers may locally store copies of the digital media files that are managed and/or organized by a media host server, and/or locally store links, such as URLs, to digital media files that are managed and/or organized by a media host server. In some implementations, content particles of digital media files are hosted by the media host server and not hosted by other servers such as real estate search servers, such that access to these content particles may be tracked regardless of which server hosts the related digital media files.

An ad server may host and/or provide digital content, usually of a commercial nature, to other servers to be presented in conjunction with one or more digital media files and/or web pages for display on client computing platforms. The digital content may include advertisements, coupons, offers, sales information, branding information, and/or other information of a commercial nature. These types of information of a commercial nature may jointly be referred to as "ads" throughout this disclosure. For example, a particular server that hosts a website related to real estate in a particular geographical area may be provided, by an ad server, with digital content that includes advertisements for local real estate brokers in the particular geographical area that is related to the particular server. By virtue of using a tracking mechanism as disclosed herein, the providers of digital content pertaining to real estate listings may share revenue from ads.

The system may include a server that communicates with, by way of non-limiting example, a media host server, one or more real estate search servers, and one or more client computing platforms that are associated with one or more users. The users may interact, e.g. through browser software applications being executed on client computing platforms, with one or more real estate search servers to search for information pertaining to real estate listings. A real estate search server may access the media host server to access and/or retrieve one or more pertinent digital media files that are relevant to one or more particular web search queries. The one or more pertinent digital media files may then be presented for display to the one or more users in responsive to entered web search queries. When a digital media file is presented for display, the browser software application may engage a marker that is embedded within the digital media file. Alternatively, and/or simultaneously, when a digital media file is presented for display, the browser software application may engage a content particle identifier that identifies a content particle of a digital media file. Responsive to such an engagement, the server may receive one or more transmissions that indicate occurrences of specific digital media files being presented for display. The server may thus track the use and/or presentation of digital media files pertaining to real estate listings.

The server may include one or more processors configured to execute computer program modules. The computer program modules configured to track digital content on the internet, particularly digital media files pertaining to real estate listings, may include a correlation module, a service module, a tracking module, a transmission module, a report module, an analytics module, a marker module, and/or other modules.

The correlation module may be configured to store correlations between markers and digital media identifiers such that individual ones of the markers are correlated with individual ones of the digital media identifiers. Alternatively, and/or simultaneously, the correlation module may be configured to store correlations between digital media files and content particles and/or content particle identifiers. Digital media identifiers identify one or more digital media files. A digital media identifier may include a file name, a property identifier, an encryption and/or hash code, and/or other information that may be used to identify one or more digital media files. Content particle identifiers identify one or more content particles. A content particle identifier may include a file name, a property identifier, and/or other information that may be used to identify one or more content particles, client computer platforms, users, and/or digital media files. A content particle may be related to and/or a part of a digital media file, such as one or more images, a portion of text, and/or a key or code used to encode and/or encrypt all or part of a digital media file. For example, a content particle may include all or some of the images of a digital media file. In some implementations, a client computing platform (e.g. through a browser software application being executed thereon) may be unable to present all or some of a digital media file without the related content particle. In some implementations, a digital media file may be presentable without the related content particle, but at least some information (e.g. important information related to a real estate listing) that is related to and/or included in the digital media file may not be presentable in a meaningful manner until and/or unless the related content particle is available to the client computing platform.

The digital media files may pertain to real estate listings, as described above. The digital media files and/or the content particles may be hosted by a media host server, and/or by one or more other servers. The digital media files may be accessible to users and/or client computing platforms for presentation through real estate search servers that have access to a media host server and/or other through one or more other servers. For example, in some implementations, the functional roles of a media host server and a real estate search server as described may be combined and/or shared by one or more servers. In some implementations, a correlation between a digital media identifier and a marker may be explicit, for example by including the digital media identifier in the marker. Alternatively, and/or simultaneously, the correlation may be indirect, for example by encoding or encrypting the digital media identifier and including the result in a marker.

Markers may be embedded within digital media files. Individual ones of the markers may be embedded within individual ones of the digital media files, and/or multiple digital media files. Client computing platforms may engage markers and/or content particle identifiers during presentation of digital media files on the client computing platforms. Engaging a marker may include one of more of rendering and/or displaying image data (for example retrieved and/or requested from a remote server), resolving an embedded link, executing an embedded script, and/or other ways to engage a marker. Engaging a content particle identifier may include one of more of rendering and/or displaying image data (for example retrieved and/or requested from a remote server), resolving an embedded link, and/or other ways to engage a content particle identifier. Engaging a marker and/or a content particle identifier may be performed by a browser software application being executed on a client computing platform, e.g. in conjunction with displaying one or more digital media files for presentation. Image data of a marker and/or a content particle identified by a content particle identifier may for example include (links to) jpg-images, png-images, gif-images, mp4 video, and/or other formats for still images, animated images, other graphics/animations, and/or video images. In some implementations, markers may be embedded by the marker module and/or under control of the marker module, described elsewhere herein.

The service module may be configured to receive transmissions from client computing platforms. The client computing platforms may transmit the transmissions when displaying digital media files and engaging markers embedded within the digital media files. The received transmissions may indicate occurrences of digital media files being presented on client computing platforms. Individual ones of the received transmissions may indicate an individual occurrence of, e.g., one or more digital media files being presented on an individual client computing platform. For example, a client computing platform may present one or more digital media files in response to a web search query being entered in a user interface of a real estate search server. The one or more digital media files may be hosted by a media host server and/or other server that may be accessed, through a network such as the internet, by the real estate search server. In some implementations, digital media files may be hosted by the real estate search server, which may obviate the need to retrieve the digital media files from another server.

Receipt of transmissions from client computing platforms may be responsive to browser software applications engaging markers and/or content particle identifiers, while being executed on client computing platforms, during presentations of digital media files in which the markers are embedded. Received transmissions may include content particle identifiers, digital media identifiers, information related to browsing activity on the client computing platforms from which the transmission are received, and/or other information. The digital media identifiers may have been included in the digital media files, the markers, or otherwise combined with received transmissions. Individual received transmissions may include individual digital media identifiers that identify one or more particular digital media files.

Information related to browsing activity, as may be included in an individual transmission received by the service module, may include one or more of a domain identifier that identifies an individual real estate search server (particularly the real estate search server through which the one or more particular digital media files were accessed for presentation to one or more client computing platforms), additional content information based on digital content being presented in conjunction with the presentation of one or more digital media files, and/or other information related to browsing activity. A domain identifier may also be referred to as a server identifier. The additional content information may be of a commercial nature, and may pertain to ads.

The tracking module may be configured to determine which digital media files have been presented on client computing platforms, the determination being based on the transmissions received by the service module and/or other information. Alternatively, and/or simultaneously, the tracking module may be configured to determine which real estate search server provided access to the presented digital media files, the determination being based on the transmissions received by the service module and/or other information. In particular, the tracking module may be configured to associate occurrences of digital media files being presented on one or more client computing platforms with the domain identifiers and/or content particle identifiers included in transmissions received by the service module. Such associations may be responsive to receipt of one or more transmissions by the service module. Individual ones of the occurrences of a digital media file being presented on one or more client computing platforms may be associated, by the tracking module, with individual domain identifiers included in individual received transmissions. In some implementations, determinations by the tracking module may be based on correlations stored by the correlation module. For example, received transmissions may include information based on particular markers that may be correlated with particular digital media identifiers. The particular markers may have been embedded in digital media files that are identified by the particular digital media identifiers.

The transmission module may be configured to transmit digital information to client computing platforms. The digital information may include content particles of digital media files, image data and/or cookies, and/or other tracking information. The transmission module may operate in response to requests from client computing platforms. In some implementations, a particular client computing platform may request image data from the server, which may subsequently be transmitted, by the transmission module, to the particular requesting client computing platform. The digital information and/or tracking information transmitted by the transmission module may be used to track browsing activity on client computing platforms.

The report module may be configured to aggregate occurrences of digital media files being presented through real estate search servers, for example per individual real estate search server. The report module may be configured to combine information from transmissions received by the service module with associations made by the tracking module and/or correlations stored by the correlation module. Results by the report module may be combined in reports, bills, messages, information presented for display, and/or other ways to combine and/or present results. The report module may be configured to determine, based on information from other modules, a fair compensation for the providers of digital content pertaining to real estate listings, e.g. through a pay-per-listing model. The report module may be configured to determine compensations per domain, per domain identifier, per real estate search server, per legal entity or business associated with any of these, and/or any combination or aggregation thereof. The report module may be configured to produce bills, invoices, and/or other financial documents and/or messages to initiate the collection of payments based on the determined compensations.

The analytics module may be configured to determine relations, e.g. statistical relations, of information pertaining to and/or within digital media files with information pertaining to particular users and/or client computing platforms. Alternatively, and/or simultaneously, the analytics module may be configured to determine relations, e.g. statistical relations, of particular ads with information from other modules. For example, the analytics module may use data mining techniques to determine the level of interest a particular user (e.g. being associated with a particular client computing platform) appears to have in a particular real estate listing, the efficacy and/or performance of particular ads or particular types of ads presented in conjunction with one or more digital media files (e.g. ads that have some specific characteristic in common), and/or make other determinations that pertain to the use of real estate search servers, browsing activity, real estate listings, and/or related digital media files.

The marker module may be configured to embed markers in digital media files and/or assist and/or control the process of embedding markers in digital media files. In some implementations, entities that originate and/or provide digital media files, such as e.g. listing agents, may communicate with a media host server through the marker module. For example, the marker module may be configured to generate a user interface that listing agents and/or other online entities can use to upload digital media files to a media host server that provides storage for, management of, organization of, and/or access to the uploaded digital media files. During the process of uploading digital media files, the marker module may embed markers within the digital media files, as described elsewhere herein. In some implementations, the marker module may be configured to communicate with a media host server, e.g. in response to a request, instruction, and/or command from a listing agent, to embed markers within digital media files that have been previously uploaded and/or provided to the media host server. In such implementations, the marker module may not be directly involved in uploading and/or providing the digital media files originally to the media host server. In some implementations, the marker module may be configured to communicate with real estate search servers to embed markers within digital media files that have been previously uploaded and/or provided to the media host server. Other implementations, as well as combinations of multiple implementations, are envisioned for the marker module.

One aspect of the disclosure relates to methods for tracking real estate content, in particular digital media files, on the internet, from an online entity of origin, via a media host server and/or a real estate search server, to client computing platforms that are associated with users.

These and other objects, features, and characteristics of the servers, systems and/or methods disclosed herein, as well as the methods of operation and functions of the related elements of structure and the combination of parts and economies of manufacture, will become more apparent upon consideration of the following description and the appended claims with reference to the accompanying figures, all of which form a part of this specification, wherein like reference numerals designate corresponding parts in the various figures. It is to be expressly understood, however, that the figures are for the purpose of illustration and description only and are not intended as a definition of any limits. As used in the specification and in the claims, the singular form of "a", "an", and "the" include plural referents unless the context clearly dictates otherwise. As used in the specification and in the claims, in a list of items that includes the separator "and/or", combinations of those items, insofar as practically possible, are envisioned as embodiments.

DETAILED DESCRIPTION

Figure 1:
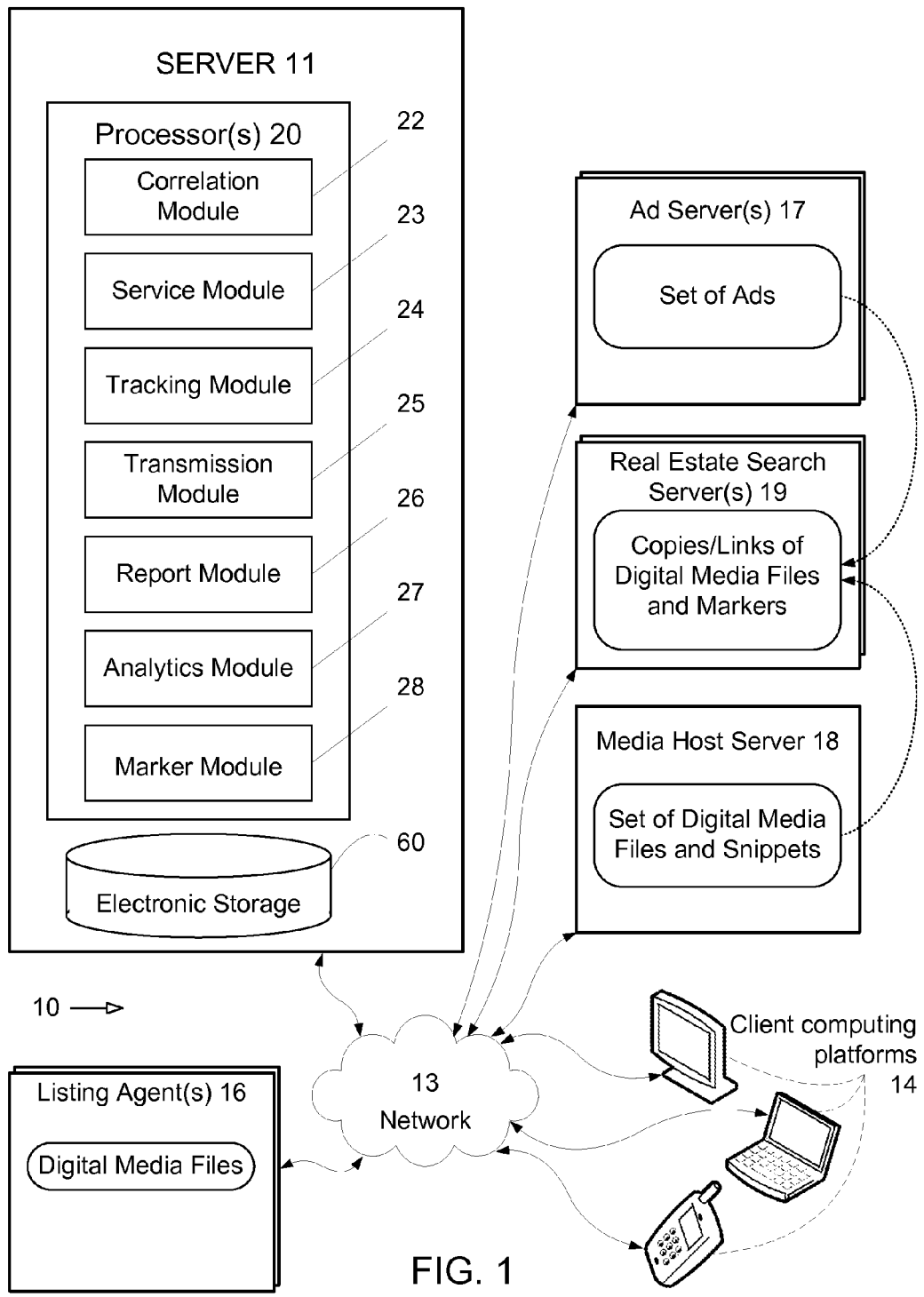
FIG. 1 illustrates a system configured to track real estate content in accordance with one or more implementations.

FIG. 1 illustrates a system 10 configured to track digital real estate content, in particular electronic information pertaining to real estate listings, on the internet and/or on one or more other networks. System 10 may facilitate communication between listing agents, prospective real estate sellers, real estate agents, real estate brokers, real estate sales people, real estate agencies, brokerage firms (collectively referred to as listing agents), users, prospective real estate buyers, buyer agencies, buyer brokerages (collectively referred to as users), multiple listing services, media host servers, real estate search servers, ad servers, client computing platforms, and/or other people and entities that may be related to or interested in real estate and/or real estate listings, as well as intermediaries and/or associates of such people and entities. By virtue of the tracking mechanisms disclosed herein, the providers of digital real estate content (e.g. the listing agents) may share (advertising and/or sales) revenue as appropriate (e.g. with the multiple listing services, real estate search servers 19, and/or ad servers 17), and/or be otherwise compensated. Payment models may include a pay-per-listing model, a pay-per-view model, and/or other models.

Digital real estate content, for example digital media files containing image data, listing information, property information, and/or other information, may be presented for display to users on client computing platforms 14 associated with those users. Individual users such as, by way of non-limiting example, prospective real estate buyers may request and/or view one or more digital media files through a website that is hosted by a server, in particular real estate search server 19. The website, its web pages, and/or the digital media files included therein, may be accessed through browser software applications being executed on client computing platforms 14.

The presented digital media files may be hosted by, copied from, and/or links to a media host server 18 that provides storage for, management of, organization of, and/or access to the digital media files, and/or content particles of such digital media files. By way of non-limiting example, media host server 18 may be a server associated with a multiple listing service, e.g. a multiple listing service for a particular geographical area. Media host server 18 may manage a database and/or set of digital media files pertaining to real estate listings within the particular geographical area. Digital media files pertaining to a particular real estate listing may have been provided to media host server 18 by a prospective real estate seller, an associated listing agent, and/or another appropriate party representing an interest in a transaction involving the particular real estate listing. By virtue of the content tracking mechanism described herein, a server 11 may establish, among other information, which digital media files have been presented, in conjunction with which (types of) ads, through which real estate search server 19, to which users.

System 10 may include one or more client computing platforms 14, one or more listing agents 16, one or more ad servers 17, one or more real estate search servers 19, a media host server 18, electronic storage 60, a server 11, one or more processors 20, and/or other components. The components in FIG. 1 may be communicatively coupled through one or more networks 13, including but not limited to the Internet. Server 11 may interchangeably be referred to as server system 11 throughout this disclosure. One or more of the processors 20, electronic storage 60, and/or other components may be included in server 11.

One or more processors 20 may be configured to execute computer program modules. The computer program modules may include a correlation module 22, a service module 23, a tracking module 24, a transmission module 25, a report module 26, an analytics module 27, a marker module 28, and/or other modules.

In some implementations, content particles of digital media files may be hosted by media host server 18 while the remainder of the digital media files (or the digital media files that are related to the content particles) may be hosted at any server. During presentation of the remainder of the digital media files (or the digital media files that are related to the content particles), the browser software application being executed on a particular client computing platform 14 engages a content particle identifier that identifies a particular content particle. Note that all or some of the presentation may not be presentable without the particular content particle. Responsive to this engagement, the browser application software may establish a connection to media host server 18 to retrieve the particular content particle that is identified by the engaged content particle identifier, and/or otherwise cause a transmission to media host server 18. Responsive to receipt of such a transmission by service module 23, transmission module 25 may transmit the particular content particle to the particular client computing platform. Responsive to the transmission by transmission module 25, the browser software application may receive and use the particular content particle, e.g. a fragment of a photograph, to present the digital media file including any part that was previously not presentable for lack of the particular content particle.

Correlation module 22 may be configured to store correlations between markers and digital media identifiers, for example such that individual ones of the markers are correlated with individual ones of the digital media identifiers. Alternatively, and/or simultaneously, correlation module 22 may be configured to store correlations between digital media files and content particles and/or content particle identifiers. Digital media identifiers may identify one or more digital media files. A digital media identifier may include a file name, a property identifier, an encryption and/or hash function based on information related to a digital media file, and/or other information that may be used to identify one or more digital media files. Content particle identifiers identify one or more content particles. A content particle identifier may include a file name, a property identifier, and/or other information that may be used to identify one or more content particles, one or more client computer platforms 14, users, and/or digital media files. A content particle may be related to and/or a part of a digital media file, such as an image, a portion of text, and/or a key or code used to encode and/or encrypt all or part of a digital media file. In some implementations, client computing platform 14 (e.g. through a browser software application being executed thereon) may be unable to present all or some of a digital media file without the related content particle. In some implementations, a digital media file may be presentable without the related content particle, but at least some information (e.g. important information related to a real estate listing) that is related to and/or included in the digital media file may not be presentable in a meaningful manner until and/or unless the related content particle is available to client computing platform 14.

The digital media files may pertain to real estate listings, as described above. The digital media files and/or the content particles may be hosted by media host server 18, and/or by one or more other servers. The digital media files may be accessible to users and/or client computing platforms 14 for presentation through real estate search servers 19 that have access to media host server 18 and/or other through one or more other servers. For example, in some implementations, the functional roles of media host server 18 and one or more of real estate search servers 19 as described may be combined and/or shared by one or more servers. In some implementations, a correlation between a digital media identifier and a marker may be explicit, for example by including the digital media identifier in the marker. Alternatively, and/or simultaneously, the correlation may be indirect, for example by encoding or encrypting the digital media identifier and including the result in a marker.

Markers may be embedded within digital media files. Individual ones of the markers may be embedded within individual ones of the digital media files, and/or multiple digital media files. Client computing platforms 14 may engage markers and/or content particle identifiers during presentation of digital media files on client computing platforms 14. Engaging a marker may include one of more of rendering and/or displaying image data (for example retrieved and/or requested from a remote server, media host server 18, and/or server 11), resolving an embedded link, executing an embedded script (which may, e.g., transmit information to a remote server, media host server 18, and/or server 11), and/or other ways to engage a marker. Engaging a content particle identifier may include one of more of rendering and/or displaying image data (for example retrieved and/or requested from media host server 18), resolving an embedded link, and/or other ways to engage a content particle identifier. Engaging a marker and/or content particle identifier may be performed by a browser software application being executed on client computing platform 14, e.g. in conjunction with displaying one or more digital media files for presentation. Image data of a marker and/or a content particle identified by a content particle identifier may for example include (links to) jpg-images, png-images, gif-images, mp4 video, and/or other formats for still images, animated images, other graphics/animations, and/or video images. In some implementations, markers may be embedded by marker module 28 and/or under control of marker module 28, described elsewhere herein.

Service module 23 may be configured to receive transmissions from client computing platforms 14. Transmission received by service module 23 may include requests for (image) information from client computing platforms 14, for example by virtue of an <img> tag in an HTML webpage referring to a source URL within a domain controlled by server 11. For example, the requested image information may include a transparent 1×1 pixel GIF image. Client computing platforms 14 may transmit the transmissions when displaying digital media files and engaging content particle identifiers and/or engaging markers embedded within the digital media files. The received transmissions may indicate and/or imply occurrences of digital media files being presented on client computing platforms 14. Individual ones of the received transmissions may indicate and/or imply an individual occurrence of, e.g., one or more digital media files being presented on an individual client computing platform 14. For example, a client computing platform 14 may present one or more digital media files in response to a web search query being entered in a user interface of real estate search server 19. The one or more digital media files may be hosted by media host server 18 and/or another server that may be accessed, through a network 13 such as the internet, by real estate search server 19. In some implementations, digital media files may be hosted by real estate search server 19, which may obviate the need to retrieve the digital media files from another server.

Receipt of transmissions from client computing platforms 14 may be responsive to browser software applications engaging markers and/or content particle identifiers, while being executed on client computing platforms 14, during presentations of digital media files, e.g. digital media files in which markers are embedded. Received transmissions may include content particle identifiers, digital media identifiers, information related to browsing activity on client computing platforms 14 from which the transmission are received, and/or other information. The digital media identifiers may be included in the digital media files, the markers, or otherwise combined with received transmissions. Individual received transmissions may include individual digital media identifiers that identify one or more particular digital media files.

Information related to browsing activity, as may be included in an individual transmission received by service module 23, may include one or more of a domain identifier that identifies an individual real estate search server 19 (particularly the real estate search server 19 through which the one or more particular digital media files were accessed for presentation to one or more client computing platforms 14), additional content information based on digital content being presented in conjunction with the presentation of one or more digital media files, and/or other information related to browsing activity. For example, the information related to browsing activity may include one or more of an IP address or a MAC address of the pertinent client computing platform 14, information about the hardware and/or software configuration of the pertinent client computing platform 14, a cookie from the pertinent client computing platform 14, and/or information (e.g. geographical information) related to an internet service provider (ISP) used by the pertinent client computing platform 14 to access the internet. Information related to browsing activity may include information about which ads have been clicked on, and/or how much time is spent on a particular webpage and/or particular digital media file, as well as other usage statistics related to browsing activity. The additional content information may be related to content of a commercial nature, e.g. ads. For example, the additional content information may be used to determine which particular ads are presented to a user in conjunction with a particular digital media file. A domain identifier may also be referred to as a server identifier.

Tracking module 24 may be configured to determine which digital media files have been presented on client computing platforms 14, the determination being based on the transmissions received by service module 23 and/or other information. Alternatively, and/or simultaneously, tracking module 24 may be configured to determine which real estate search server 19 provided access to the presented digital media files, the determination being based on the transmissions received by service module 23 and/or other information. In particular, tracking module 24 may be configured to associate occurrences of digital media files being presented on one or more client computing platforms 14 with the domain identifiers included in transmissions received by service module 23. Such associations may be responsive to receipt of one or more transmissions by service module 23. Individual ones of the occurrences of a digital media file being presented on one or more client computing platforms 14 may be associated, by tracking module 24, with individual domain identifiers included in individual received transmissions. In some implementations, determinations by tracking module 24 may be based on correlations stored by correlation module 22. For example, received transmissions may include information based on particular markers that may be correlated with particular digital media identifiers. The particular markers may have been embedded in digital media files that are identified by the particular digital media identifiers.

Tracking module 24 may be configured to determine which ads have been presented in conjunction with particular digital media files. This determination may be based on transmissions received by service module 23, based on cookies retrieved from and/or stored on client computing platforms 14, and/or based on other information.

Transmission module 25 may be configured to transmit digital information to client computing platforms 14. The digital information may include image data and/or cookies, and/or other tracking information. Transmission module 25 may operate in response to requests from client computing platforms 14. In some implementations, a particular client computing platform 14 may request image data from server 11, which may subsequently be transmitted, by transmission module 25, to the particular requesting client computing platform 14. The digital information and/or tracking information transmitted by transmission module 25 may be used to track browsing activity on client computing platforms 14. For example, cookies transmitted by transmission module 25 may be used by tracking module 24, report module 26, analytics module 27, and/or other components of server 11.

Report module 26 may be configured to aggregate occurrences of digital media files and/or ads being presented through real estate search servers 19, for example per individual real estate search server 19. Report module 26 may be configured to combine information from transmissions received by service module 23 with associations made by the tracking module 24 and/or correlations stored by the correlation module 22. Results by report module 26 may be combined in reports, bills, messages, information presented for display, and/or other ways to combine and/or present results. Report module 26 may be configured to aggregate information about the presentations of digital media files and/or ads pertaining to one or more particular real estate listings, for example in one or more reports for the one or more listing agents related to the one or more particular real estate listings. Report module 26 may be configured to determine, based on information from other modules, intended financial compensation for the providers of digital content pertaining to real estate listings, e.g. through a pay-per-listing model. For example, proper compensation may ensure continued participation and provision of digital real estate content. Report module 26 may be configured to determine (proposed, suggested, and/or requested) compensations per domain, per domain identifier, per real estate search server, per legal entity or business associated with any of these, and/or any combination or aggregation thereof. Report module 26 may be configured to produce bills, invoices, and/or other financial documents and/or messages to initiate the collection of payments based on the determined (proposed) compensations, as well as financial documents to initiate the distribution of payments based on the determined intended compensations for, e.g., listing agents.

Analytics module 27 may be configured to determine relations, e.g. statistical relations, of information pertaining to and/or within digital media files with information pertaining to particular users and/or client computing platforms 14. Alternatively, and/or simultaneously, analytics module 27 may be configured to determine relations, e.g. statistical relations, of particular ads with information from other modules. For example, analytics module 27 may use data mining techniques to determine the level of interest a particular user (e.g. being associated with a particular client computing platform 14) appears to have in a particular (type of) real estate listing, the efficacy and/or performance of particular ads or particular types of ads presented in conjunction with one or more digital media files (e.g. ads that have some specific characteristic in common), and/or make other determinations that pertain to the use of real estate search servers 19, browsing activity, real estate listings, and/or related digital media files.

Marker module 28 may be configured to embed markers in digital media files and/or assist and/or control the process of embedding markers in digital media files. In some implementations, entities that originate and/or provide digital media files, such as e.g. listing agents, may communicate with media host server 18 through marker module 28. For example, marker module 28 may be configured to generate a user interface that listing agents and/or other online entities can use to upload digital media files to media host server 18 that provides storage for, management of, organization of, and/or access to the uploaded digital media files. During the process of uploading digital media files, marker module 28 may embed markers within the digital media files, for example by inserting a script and/or image in a digital media file such as a webpage. By way of non-limiting example, inserting a transparent 1×1 pixel GIF image in an HTML webpage through an <img> tag may be one implementation of embedding a marker in a digital media file.

In some implementations, marker module 28 may be configured to communicate with media host server 18, e.g. in response to a request, instruction, and/or command from a listing agent, to embed markers within digital media files that have been previously uploaded and/or provided to media host server 18. In such implementations, marker module 28 may not be directly involved in uploading and/or providing the digital media files originally to media host server 18. In some implementations, marker module 28 may be configured to communicate with real estate search servers 19 to embed markers within digital media files that have been previously uploaded and/or provided to media host server 18. Other implementations, as well as combinations of multiple implementations, are envisioned for marker module 28.

In some implementations, the process of embedding markers within digital media files may be performed locally by real estate search server 19. For example, a script and/or image may be inserted into a digital media file (e.g. dynamically, i.e. upon a request from a user through a client computing platform) when the pertinent digital media file is presented to the client computing platform associated with the user. Dynamically embedded markers may not only be correlated to one or more digital media identifiers and/or digital media files, but may furthermore include information related to browsing activity on a client computing platform, such as, by way of non-limiting example, additional content information based on digital content being presented in conjunction with the presentation of the one or more digital media files, such as ads.

One or more processors 20 may be configured to provide information processing capabilities in system 10 and/or server 11. As such, processor 20 may include one or more of a digital processor, an analog processor, a digital circuit designed to process information, an analog circuit designed to process information, a state machine, and/or other mechanisms for electronically processing information. Although processor 20 may be shown in FIG. 1 as a single entity, this is for illustrative purposes only. In some implementations, processor 20 may include a plurality of processing units. These processing units may be physically located within the same device, or processor 20 may represent processing functionality of a plurality of devices operating in coordination (e.g., "in the cloud", and/or other virtualized processing solutions).

It should be appreciated that although modules 22-28, are illustrated in FIG. 1 as being co-located within a single processing unit, in implementations in which processor 20 includes multiple processing units, one or more of modules 22-28 may be located remotely from the other modules. The description of the functionality provided by the different modules 22-28 described herein is for illustrative purposes, and is not intended to be limiting, as any of modules 22-28 may provide more or less functionality than is described. For example, one or more of modules 22-28 may be eliminated, and some or all of its functionality may be provided by other ones of modules 22-28. As another example, processor 20 may be configured to execute one or more additional modules that may perform some or all of the functionality attributed herein to one of modules 22-28.

Electronic storage 60 of system 10 in FIG. 1 may comprise electronic storage media that stores information. The electronic storage media of electronic storage 60 may include one or both of system storage that is provided integrally (i.e., substantially non-removable) with server 11 and/or removable storage that is removably connectable to server 11 via, for example, a port (e.g., a USB port, a FIREWIRE™ port, etc.) or a drive (e.g., a disk drive, etc.). Electronic storage 60 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), network-attached storage (NAS), and/or other electronically readable storage media. Electronic storage 60 may include virtual storage resources, such as storage resources provided via a cloud and/or a virtual private network. Electronic storage 60 may store software algorithms, information determined by processor 20, information received via client computing platforms 14, and/or other information that enable server 11 and system 10 to function properly. Electronic storage 60 may be separate components within system 10, or electronic storage 60 may be provided integrally with one or more other components of system 10 (e.g., processor 20).

Figure 2:
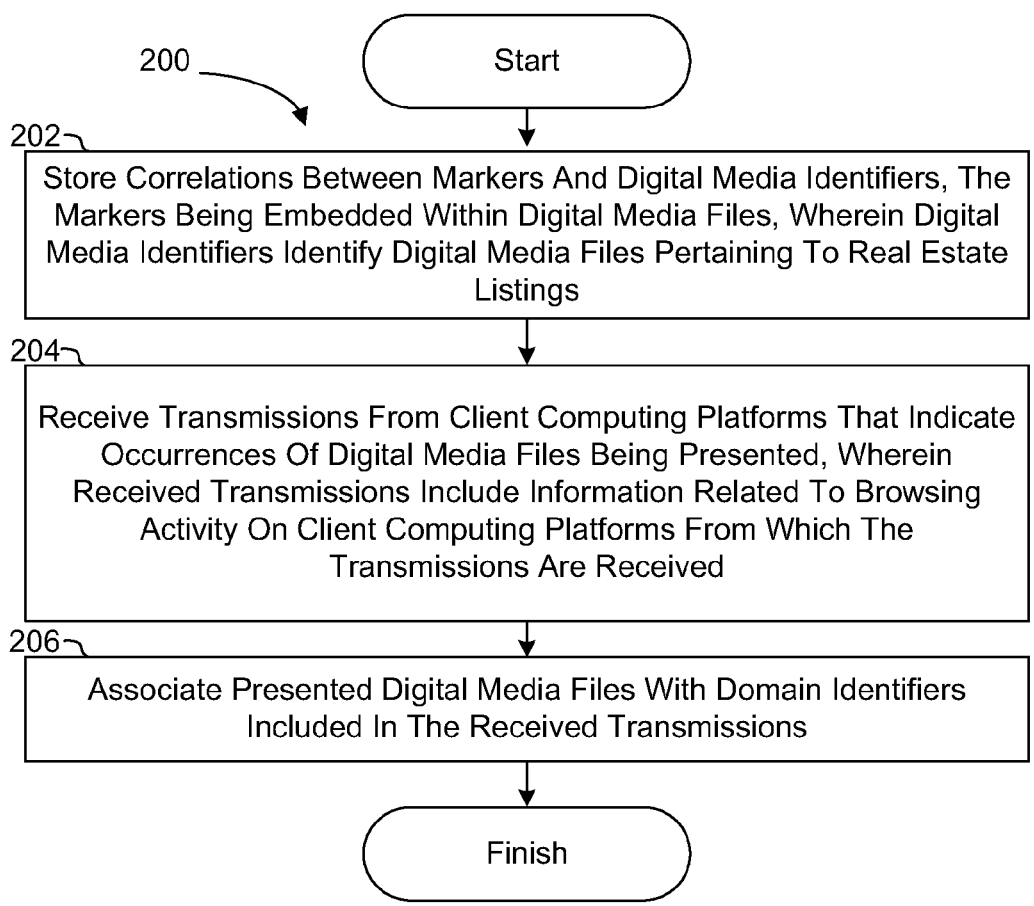
FIG. 2 illustrates a method for tracking real estate content in accordance with one or more implementations.
Figure 3:
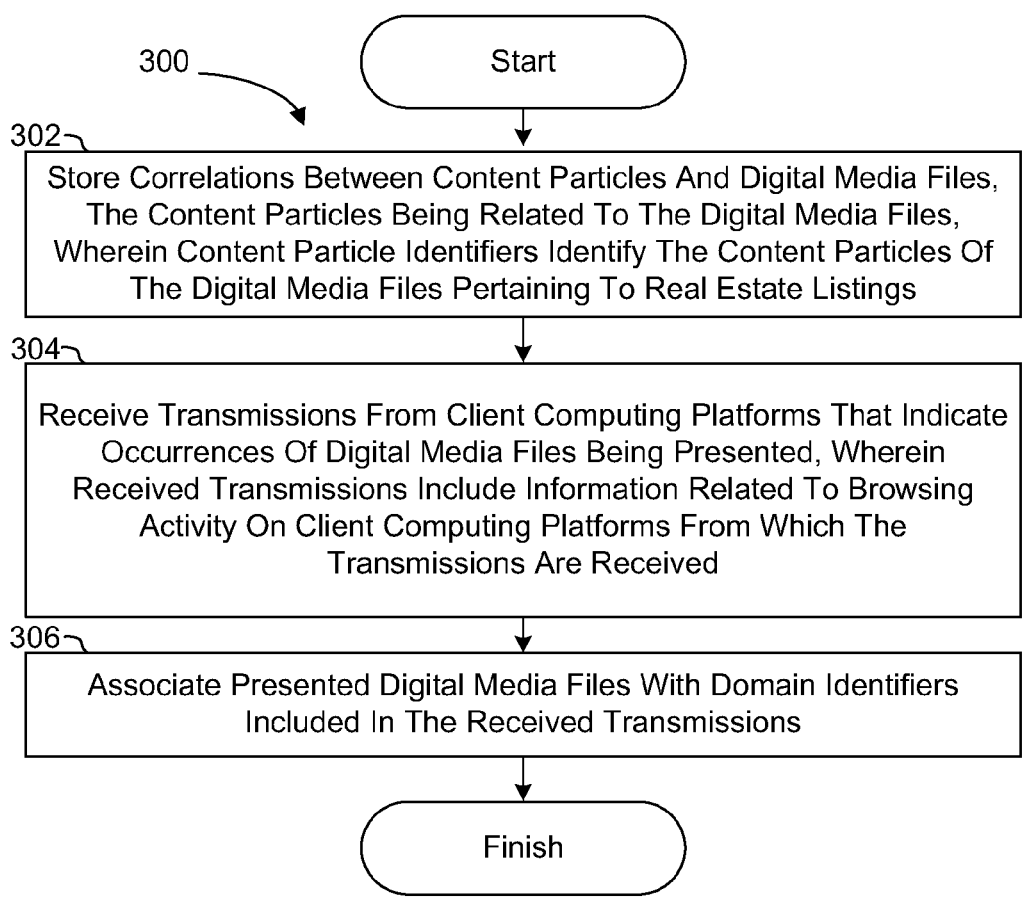
FIG. 3 illustrates a method for tracking real estate content in accordance with one or more implementations.

FIG. 2 and FIG. 3 illustrate a method 200 and a method 300 for tracking real estate content on the internet. Regarding method 200, at an operation 202, correlations are stored between markers and digital media identifiers. The markers have been embedded within digital media files. The digital media identifiers identify digital media files. The digital media files pertain to real estate listings. The digital media files are hosted by a media host server. The digital media files are accessible to client computing platforms through real estate search servers that have access to the media host server. In some implementations, operation 202 may be performed by a correlation module that is the same as or similar to correlation module 22 (shown in FIG. 1 and described herein).

At an operation 204, transmissions that indicate occurrences of digital media files being presented are received from client computing platforms. Received transmissions include information related to browser activity on the client computing platforms from which the transmissions are received. In some implementations, operation 204 may be performed by a service module that is the same as or similar to service module 23 (shown in FIG. 1 and described herein).

At an operation 206, presented digital media files are associated with domain identifiers included in the received transmissions. In some implementations, operation 206 may be performed by a tracking module that is the same as or similar to tracking module 24 (shown in FIG. 1 and described herein).

Regarding method 300, at an operation 302, correlations are stored between digital media files and content particles. The content particles are related to the digital media files. Content particle identifiers identify the content particles of digital media files. The digital media files pertain to real estate listings. The digital media files are hosted by a media host server. The digital media files are accessible to client computing platforms through real estate search servers that have access to the media host server. In some implementations, operation 302 may be performed by a correlation module that is the same as or similar to correlation module 22 (shown in FIG. 1 and described herein).

At an operation 304, transmissions that indicate occurrences of digital media files being presented are received from client computing platforms. Received transmissions include information related to browser activity on the client computing platforms from which the transmissions are received. In some implementations, operation 304 may be performed by a service module that is the same as or similar to service module 23 (shown in FIG. 1 and described herein).

At an operation 306, presented digital media files are associated with domain identifiers included in the received transmissions. In some implementations, operation 306 may be performed by a tracking module that is the same as or similar to tracking module 24 (shown in FIG. 1 and described herein).

The operations of method 200 and method 300 presented herein are intended to be illustrative. In some embodiments, method 200 and/or method 300 may be accomplished with one or more additional operations not described, and/or without one or more of the operations discussed. Additionally, the order in which the operations of method 200 and method 300 are illustrated in FIG. 2 and FIG. 3 and described herein is not intended to be limiting.

In some embodiments, method 200 and/or method 300 may be implemented in one or more processing devices (e.g., a server, a digital processor, an analog processor, a digital circuit designed to process information, an analog circuit designed to process information, a state machine, and/or other mechanisms for electronically processing information). The one or more processing devices may include one or more devices executing some or all of the operations of method 200 and/or method 300 in response to instructions stored electronically on an electronic storage medium. The one or more processing devices may include one or more devices configured through hardware, firmware, and/or software to be specifically designed for execution of one or more of the operations of method 200 and/or method 300.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A method for tracking which real estate search server has provided particular internet-based real estate content for presentation to users, wherein the real estate content includes digital media files, wherein the method is implemented in a computer system including electronic storage, a server, and one or more processors, the method comprising:
   storing, by the one or more processors, correlations between markers and digital media identifiers, wherein the correlations are stored in the electronic storage,
   wherein the correlations include a first correlation,
   wherein the markers include a first marker that is embedded in a first digital media file,
   wherein the digital media identifiers include a first digital media identifier that identifies the first digital media file,
   wherein the first correlation correlates the first marker with the first digital media identifier,
   wherein the digital media files pertain to real estate listings,
   wherein the digital media files are hosted by a media host server,
   wherein the digital media files are accessible to a first client computing platform for presentation through one or more real estate search servers that have access to the media host server;
   receiving, by the server, transmissions from the first client computing platform, responsive to the first client computing platform engaging the markers during presentation of the digital media files by a first browser software application on the first client computing platform,
   wherein the server is identified by a server domain identifier,
   wherein the transmissions include a first transmission that is received from the first computing platform,
   wherein the first transmission indicates that the first digital media file has been accessed by the first client computing platform through the one or more real estate search servers,
   wherein the first transmission further indicates that the first digital media files has been presented by the first browser software application on the first client computing platform,
   wherein the first transmission includes:
      the first marker, wherein the first marker is correlated with the first digital media identifier that identifies the first digital media file that has been presented by the first browser software application on the first client computing platform, and
      information related to browsing activity by the first browser software application on the first client computing platform, wherein the information includes a domain identifier that identifies an individual one of the one or more real estate search servers through which access to the first digital media file has been provided, wherein the domain identifier is different than the server domain identifier;
   retrieving, responsive to receipt of the first transmission, the first correlation from the electronic storage; and
   associating individual occurrences of the first digital media file having been presented on the first client computing platform with the domain identifier included in the first transmission.

2. The method of claim 1, wherein the digital media files include markup language files.

3. The method of claim 1, wherein the media host server includes an online real estate listing service, wherein the online real estate listing service provides access to one or more of the a set of digital media files, and wherein one or more of the digital media files include image data pertaining to the real estate listings.

4. The method of claim 1, further comprising:
   embedding markers within the digital media files.

5. The method of claim 1, wherein the transmissions include requests for information.

6. The method of claim 5, wherein the received requests include requests for image information.

7. The method of claim 1, wherein the first client computing platform engaging the marker during presentation includes the first client computing platform performing at least one of:
   rendering of an image,
   resolving an embedded link, and
   executing an embedded script.

8. The method of claim 1, wherein the information related to the browsing activity includes additional content information based on digital content that has been presented in conjunction with the presentation of the first digital media file.

9. The method of claim 1, wherein the information related to the browsing activity further includes one or more of an IP address of the first client computing platform, a MAC address of the first client computing platform, or a cookie from the first client computing platform.

10. The method of claim 1, further comprising
   transmitting one or more cookies to the first client computing platform.

11. The method of claim 1, wherein the real estate search server stores at least one of copies of the digital media files being hosted by the media host server and links to the digital media files being hosted by the media host server.

12. The method of claim 1, further comprising
   aggregating occurrences of the digital media files having been presented per individual one of the one or more real estate search servers.

13. A server system configured to track which real estate search server has provided particular internet-based real estate content for presentation to users, wherein the real estate content includes digital media files, the server system comprising:

electronic storage configured to store information electronically; and a server that includes one or more processors, wherein the server is identified by a server domain identifier, wherein the one or more processors are configured to:

store, in the electronic storage, correlations between markers and digital media identifiers, wherein the correlations include a first correlation, wherein the markers include a first marker that is embedded in a first digital media file, wherein the digital media identifiers include a first digital media identifier that identifies the first digital media file, wherein the first correlation correlates the first marker with the first digital media identifier, wherein the digital media files pertain to real estate listings, wherein the digital media files are hosted by a media host server, wherein the digital media files are accessible to a first client computing platform for presentation through one or more real estate search servers that have access to the media host server;

receive transmissions from the first client computing platform, responsive to the first client computing platform engaging the markers during presentation of the digital media files by a first browser software application on the first client computing platform, wherein the transmissions include a first transmission that is received from the first client computing platform, wherein the first transmission indicates that the first digital media file has been accessed by the first client computing platform through the one or more real estate search servers, wherein the first transmission further indicates that the first digital media file has been presented by the first browser software application on the first client computing platform, wherein the first transmission includes:

the first marker, wherein the first marker is correlated with the first digital media identifier that identifies the first digital media file that has been presented by the first browser software application on the first client computing platform, and information related to browsing activity by the first browser software application on the first client computing platform, wherein the information includes a domain identifier that identifies an individual one of the one or more real estate search servers through which access to the first digital media file has been provided, wherein the domain identifier is different than the server domain identifier;

retrieve, responsive to receipt of the first transmission, the first correlation from the electronic storage; and associate individual occurrences of the first digital media file having been presented on the first client computing platform with the domain identifier included in the first transmission.

14. The server system of claim 13, wherein the digital media files include markup language files.

15. The server system of claim 13, wherein the media host server includes an online real estate listing service, wherein the online real estate listing service provides access to one or more of the digital media files, and wherein one or more of the digital media files include image data pertaining to the real estate listings.

16. The server system of claim 13, wherein the one or more processors are further configured to embed the markers within the digital media files.

17. The server system of claim 13, wherein the transmissions received include requests for information from the first client computing platform.

18. The server system of claim 17, wherein the first transmission includes a request for image information.

19. The server system of claim 13, wherein the first client computing platform engaging the markers during presentation includes the first client computing platform performing at least one of a rendering of an image, a resolution of an embedded link, and an execution of an embedded script.

20. The server system of claim 13, wherein the information related to the browsing activity by the first browser software application includes additional content information based on digital content that has been presented in conjunction with the presentation of the first digital media file.

21. The server system of claim 13, wherein the information related to the browsing activity further includes one or more of an IP address of the first client computing platform, a MAC address of the first client computing platform, or a cookie from the first client computing platform.

22. The server system of claim 13, wherein the one or more processors are further configured to transmit one or more cookies to the first client computing platform.

23. The server system of claim 13, wherein the real estate search server stores at least one of:

copies of the digital media files being hosted by the media host server and links to the digital media files being hosted by the media host server.

24. The server system of claim 13, wherein the one or more processors are further configured to aggregate occurrences of the digital media files having been presented per individual one of the one or more real estate search servers.

25. The server system of claim 13, wherein the one or more processors are further configured to determine a level of interest a user associated with the first client computing platform has in a particular real estate listing that pertains to the first digital media file.

26. A server system configured to track which real estate search server has provided particular internet-based real estate content for presentation to users, wherein the real estate content includes digital media files, the server system comprising:

a first client computing platform configured to connect to a network and interact with a user, wherein the first client computing platform is further configured to transmit transmissions via the network and execute a first browser software application to present information to the user;

a real estate search server configured to provide client computing platforms with access to digital media files via the network, wherein the client computing platforms include the first client computing platform, wherein the digital media files pertain to real estate listings, wherein the digital media files include a first digital media file, and wherein a first marker is embedded within the first digital media file;

electronic storage configured to store information electronically; and a server that includes one or more processors, wherein the server is identified by a server domain identifier, wherein the one or more processors are configured via executable instructions to:
  store correlations between markers and digital media identifiers,
    wherein the markers include the first marker, and
    wherein the digital media identifiers include a first digital media identifier that identifies the first digital media file, and
    wherein the correlation modules is configured to store, in the electronic storage, a first correlation between the first marker and the first digital media identifier;
  receive the transmissions from the first client computing platform, wherein the transmissions include a first transmission that is transmitted from the first client computing platform to the service module in response to the first client computing platform engaging the first marker during presentation of the first digital media file by the first browser software application to the user,
    wherein the first transmission indicates that the first digital media file has been accessed by the first client computing platform through the one or more real estate search servers, wherein the first transmission further indicates that the first digital media file has been presented during the presentation of the first digital media file by the first browser software application to the user,
    wherein the first transmission includes:
      the first marker, and
      information related to browsing activity by the first browser software application on the first client computing platform, wherein the information includes a domain identifier that identifies the real estate search server through which access to the first digital media file has been provided, wherein the domain identifier is different than the server domain identifier; and
  determine, responsive to receipt of the first transmission and responsive to retrieval of the first correlation from the electronic storage, that the first digital media file has been presented on the first client computing platform subsequent to provision of access by the real estate search server that is identified by the domain identifier included in the first transmission.

27. The system of claim 26, further comprising:
a second client computing platform configured to connect to the network and interact with a second user, wherein the second client computing platform is further configured to transmit transmissions via the network and execute a second browser software application to present information to the second user; and
a second real estate search server configured to provide client computing platforms with access to digital media files via the network, wherein the client computing platforms include the second client computing platform, wherein the digital media files include a second digital media file, and wherein a second marker is embedded within the second digital media file;
wherein the one or more processors are further configured to store a second correlation in the electronic storage,
wherein the markers include a second marker,
wherein the digital media identifiers include a second digital media identifier that identifies the second digital media file,
wherein the second correlation correlates between the second marker and the second digital media identifier;
wherein the one or more processors are further configured to receive transmissions from the second client computing platform,
wherein the transmissions from the second client computing platform include a second transmission that is transmitted to the service module in response to the second client computing platform engaging the second marker during presentation of the second digital media file by the second browser software application to the second user,
wherein the second transmission indicates that the second digital media file has been presented during the presentation of the second digital media file by the second browser software application to the second user,
wherein the second transmission includes:
  the second marker, and
  information related to browsing activity by the second browser software application on the second client computing platform, wherein the information includes a second domain identifier that identifies the second real estate search server through which access to the second digital media file has been provided, wherein the second domain identifier is different than the domain identifier and the server domain identifier; and
determine, responsive to receipt of the second transmission and responsive to retrieval of the second correlation from the electronic storage, that the second digital media file has been presented on the second client computing platform subsequent to provision of access by the second real estate search server that is identified by the second domain identifier included in the second transmission.

* * * * *